United States Patent [19]

Phillimore

[11] Patent Number: 4,625,157
[45] Date of Patent: Nov. 25, 1986

[54] WINDSHIELD WIPER CONTROL

[76] Inventor: Horace R. Phillimore, 20 Washington Ave., Plainfield, N.J. 07060

[21] Appl. No.: 687,466

[22] Filed: Dec. 28, 1984

Related U.S. Application Data

[63] Continuation of Ser. No. 277,273, Jun. 25, 1981, abandoned.

[51] Int. Cl.⁴ .............................................. G02P 1/04
[52] U.S. Cl. .................................... 318/443; 318/444; 318/DIG. 2; 15/250 C
[58] Field of Search ......... 318/443, 444, 483, DIG. 2; 15/250 C, 250.13

[56] References Cited

U.S. PATENT DOCUMENTS

| 3,458,889 | 8/1969 | Tann | 318/443 X |
| 3,564,374 | 2/1971 | Kearns | 318/443 |
| 3,581,178 | 5/1971 | Kearns | 318/443 |
| 3,902,106 | 8/1975 | Kearns | 318/443 |

FOREIGN PATENT DOCUMENTS 55-156738 12/1980 Japan .............................. 318/443

Primary Examiner—William M. Shoop, Jr.
Assistant Examiner—Bentsu Ro
Attorney, Agent, or Firm—George E. Kersey

[57] ABSTRACT

Method and apparatus for controlling the intermittent speed of a windshield wiper. A multi-speed motor for operating the windshield wiper is adapted to react to a change in drag of the wiper to automatically switch the motor to a different intermittent rate according to the load condition that exists.

12 Claims, 2 Drawing Figures

WINDSHIELD WIPER CONTROL

This is a continuation of Ser. No. 277,273, filed June 25, 1981, now abandoned.

BACKGROUND OF THE INVENTION

This invention relates to the control of windshield wipers, and, more particularly, to the control of such wipers when operating under variable load conditions.

Windshield wipers are commonly controlled by a motor that permits intermittent operation. Frequently, the rate of intermittent operation is adjustable. Under light moisture conditions, when it is necessary to operate the windshield wiper in order to maintain the windshield in a suitable condition for viewability, the motor is set for a relatively slow recurrence rate. If this is insufficient, and atmospheric distrubances are not serious enough to require continuous operation, the rate of intermittent operation is increased. This is done by manually adjusting the rate of intermittency.

Since atmospheric conditions can vary appreciably during the course of a drive, many motorists find it necessary to continually adjust the intermittent rate in order to maintain the desired cleaning effect.

Accordingly, it is an object of the invention to facilitate the control of windshield wipers. A related object is to facilitate the control of windshield wipers which are set for intermittent speed operation.

Another object of the invention is to avoid the need for frequent manual adjustments in the intermittent rate of windshield wiper operation in order to achieve the desired cleaning effect.

Still another object of the invention is to maintain the windshield wiper blade in a more satisfactory operating condition despite contrary changes in the surface that is being wiped.

SUMMARY OF THE INVENTION

In accomplishing the foregoing and related objects, the invention provides for responding to a change in the speed of the wiper to automatically switch the motor to a different repetition rate. As a result, when the motor is operating intermittently, a detected change in speed will bring about a different repetition rate. If the blade operates faster, indicating less frictional drag, and more moisture, the repetition rate will be increased. Conversely, if the blade operates slower, the repetition rate will be reduced.

In accordance with one aspect of the invention, the detection of a change in speed is made by monitoring the current that passes through a sensor resistor associated with the windshield wiper motor. As the windshield wiper blade encounters a change in friction or drag, the motor current changes accordingly. The increased friction and drag cause the motor current to increase with the result that the voltage drop across the motor resistor increases. This increase in voltage is used to operate an amplifier which, in turn, acts upon a switch to operate the motor with a lower repetition rate. Similarly a decrease in voltage produces a higher repetition rate.

In accordance with another aspect of the invention, the switch is in the form of a relay.

In accordance with yet another aspect of the invention, a comparator can be employed to increase the responsiveness of the system.

DESCRIPTION OF THE DRAWINGS

Other aspects of the invention will become apparent after considering several illustrative embodiments, taken in conjunction with the drawings, in which.

DETAILED DESCRIPTION

Figure 1:
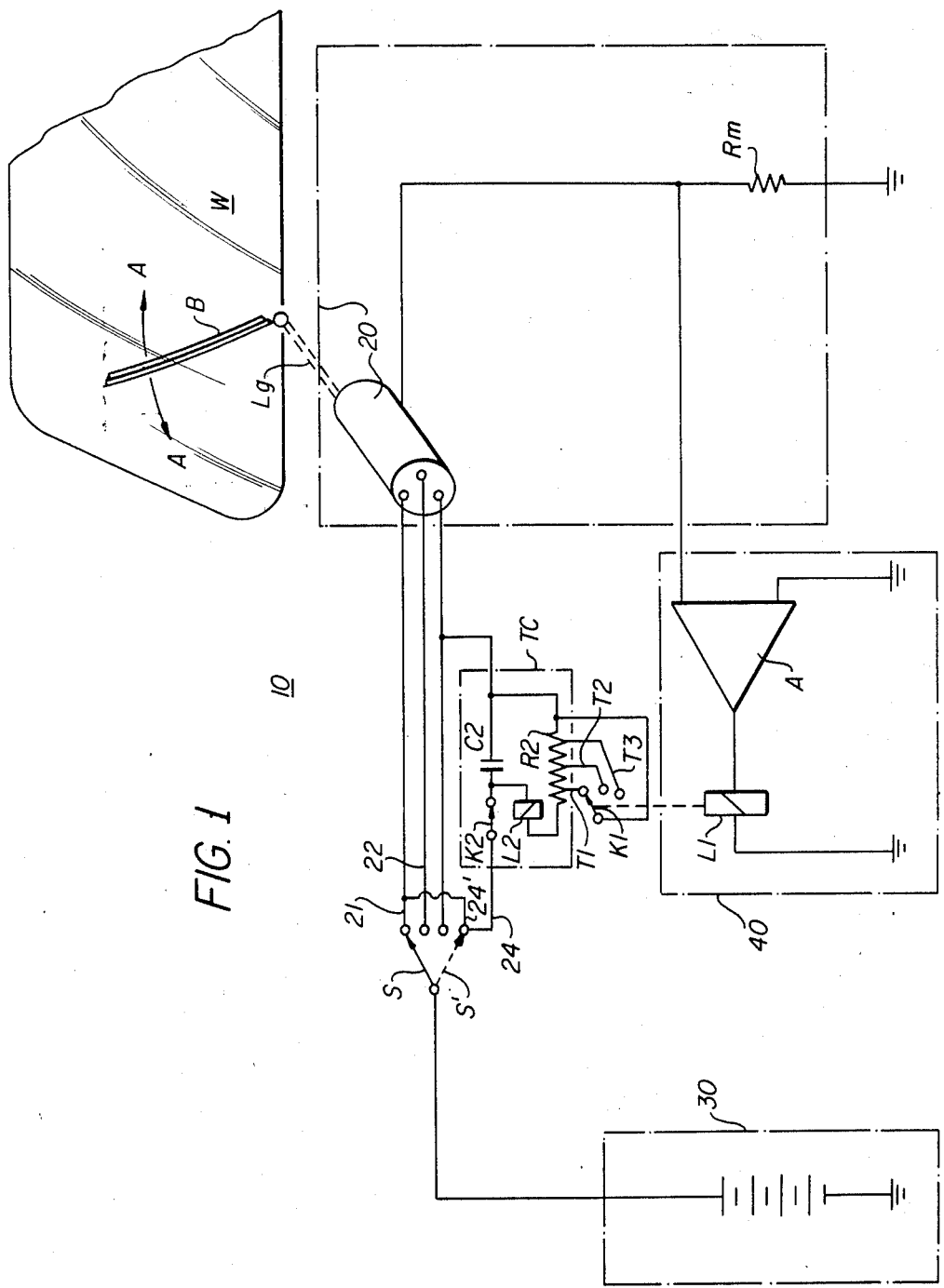
FIG. 1 is a block and schematic diagram of a windshield wiper control system in accordance with the invention.

With reference to the drawings, the control system 10 of FIG. 1 makes use of a standard windshield wiper motor 20 which is energizable from a battery source 30 and is controlled in accordance with the invention by a switch mechanism 40.

The windshield wiper motor 20 is linked to an illustrative windshield wiper blade B by a standard linkage Lg. As is customary, a four position switch is used with the motor 20. With the switch S connected to the "off" lead 21, the motor 20 is inoperative except when it has been switched to the off position during the course of a wipe by the blade B on the windshield W. The motor 20 includes conventional gearing that continues to apply voltage from the battery source 30 to the motor only when the blade is moved to its initial position. The other three positions of the switch S corresponding to contact with the "slow" speed lead 22, the "fast" speed lead 23, and the "intermittent" operation lead 24, are manually selected by the user in accordance with the atmospheric conditions that require operation of the blade B.

When the switch S is switched for intermittent operation at position S', the blade operates recurrently at intervals determined by the time constant circuit TC. The time constant circuit TC includes a capacitor C2, a relay L2 with normally closed contacts K2 and a resistor R2. When the switch S is switched to position S', the voltage is applied to the motor 20 to move the blade B off its home position. The capacitor C2 then begins to charge. Eventually the voltage is sufficient to operate relay L2 which opens the normally closed contacts K2, so that no further energization of the motor 20 takes place on the line 23. The blade nevertheless returns to its homing position because of the shunt 24' (which applies a voltage on the line 21 until disrupted by cam action at the home position).

The further operation from the line 23 with the switch in its position S' depends upon the discharge of the capacitor C2 through the shunt resistor R2. When the capacitor C2 is sufficiently discharged, the blade B is again operated.

The speed of the blade B depends upon the atmospheric condition and film of moisture on the windshield W. In order to react to the drag effect, the invention makes use of the resistor $R_m$ which connects the motor 20 to ground. The signal developed across the motor resistor $R_m$ is used to control an amplifier A in the switch 40. The level of the output of the amplifier A controls relay L1. The latter then acts to close contacts K1 to one of the tap positions T1, T2 or T3 of the resistor R2, depending upon the strength of the signal developed across resistors $R_m$.

The switch control developed across the motor resistor $R_m$ depends upon the drag encountered by the blade B. If there is sufficient atmospheric moisture on the windshield, the motor current for the resistor $R_m$ is relatively low and the amplifier A closes the contacts K1 to the first tap position T1. The time constant is low and the repetition rate is high. However, when the windshield is in a relatively dry state, the drag on the blade B of the windshield wiper causes a significant increase in the motor current that flow to the resistor $R_m$. As a result the amplifier A operates the relay L1 and closes the contacts K1 to the third tap position T3. This then causes the motor to operate in a low repetition rate (larger time constant given by the product of the effecting resistance and capacitance).

Figure 2:
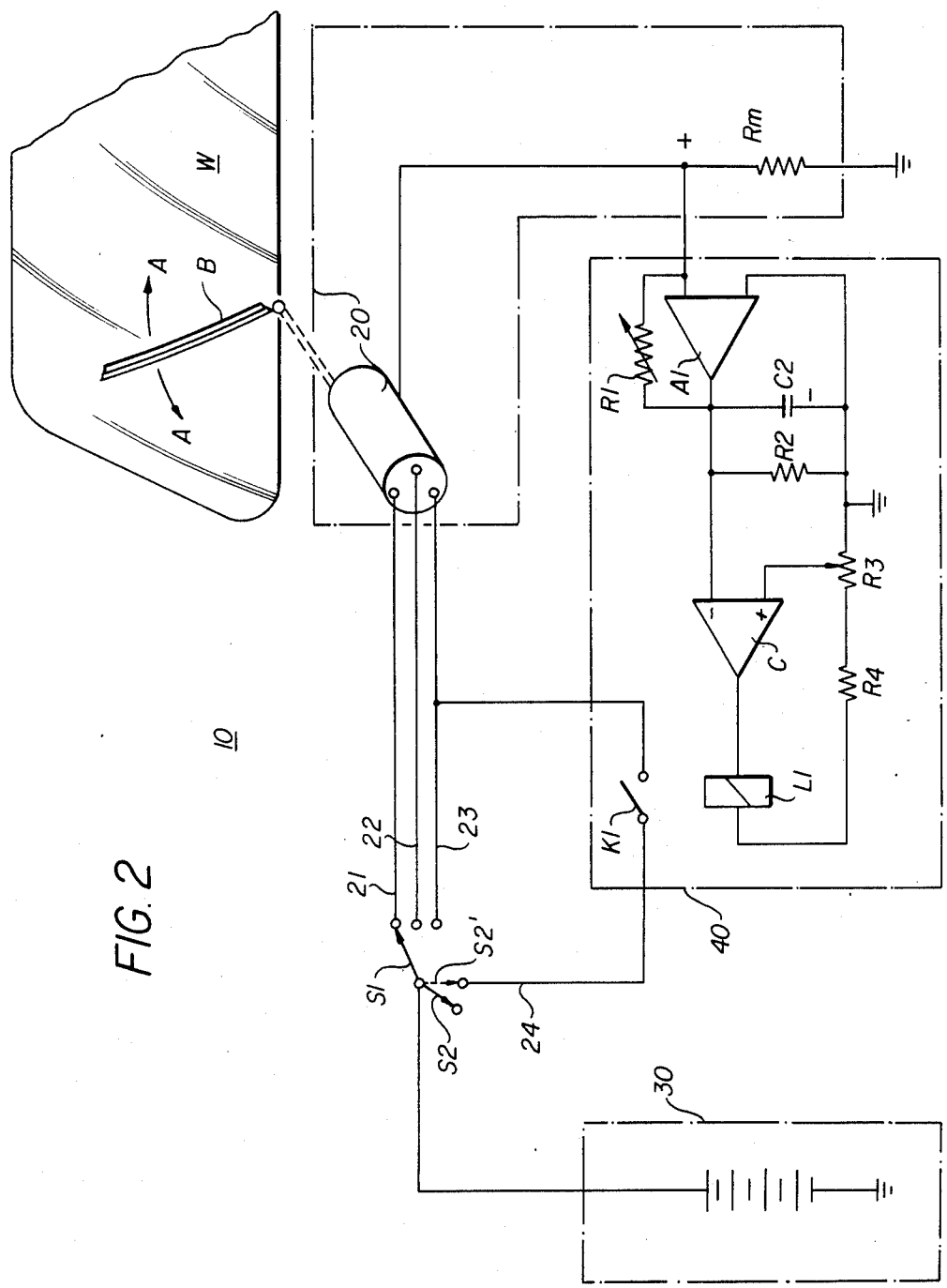
FIG. 2 is a block and schematic diagram of an alternative windshield wiper control system in accordance with the invention.

Another embodiment of the invention is shown in FIG. 2 that does not change the time constant. The switch circuitry 40' is arranged so that when the blade B is not operating the contacts K1 of the relay L1 are held closed by the energized relay. When intermittent control switch S2 is operated (closed) the motor 20 is energized. Current flows through the motor resistor $R_m$, charging the capacitor C2 and lowering the output of the comparator C. The relay L1 releases the movable contacts K1 and removes the battery voltage from the line 23. The blade B will, nevertheless, "home" because of switch S1. The repetition rate of the blade is controlled by R2-C2. In addition a variable feedback resistor R1 is included and the input of the storage capacitor C2 and the associated discharge resistor R2 in shunt. The charge-discharge circuit C2-R2 is connected to the negative input of the comparator C. The positive input of the comparator C is connected to the variable resistor R3 which includes an invariant portion R4 extending to the relay L1. Consequently, the motor current through the resistor $R_m$ determines the cut-off interval of the comparator C and hence the repetion rate of the blade B. The greater the drag, the greater the current and hence the charge on the capacitor C2 When the charge is great, it takes an appreciable interval to decay through the resistor R2. Hence the repetition rate is small, as desired. Conversely, if the charge is small, it does not take long to discharge, leading to a high repetition rate.

While various aspects of the invention have been set forth by the drawings and specification, it is to be understood that the foregoing detailed description is for illustration only and that various changes in parts, as well as the sutstitution of equivalent constitutents for those shown and described may be made without departing from the spirit and scope of the invention as set forth in the appended claims.

What is claimed is:

1. Apparatus for controlling the speed of a windshield wiper, which comprises
   a motor for operating the wiper,
   means for operating said motor intermittently,
   means for producing an electrical signal having a value in accordance with the speed of said motor, and
   means connected to the operating means and responsive solely to said electrical signal for automatically changing the rate of intermittent operation of said motor when it undergoes a change in speed,
   wherein the changing means is actuated independently of the position of said windshield wiper.

2. Apparatus as defined in claim 1 wherein the rate changing means comprises means having a prescribed time constant.

3. Apparatus as defined in claim 1 wherein the operating means includes bypass controlled by the rate changing means.

4. Apparatus for controlling the speed of a windshield wiper motor, which comprises
   a motor for operating the wiper,
   means for operating said motor intermittently including a bypass or shunt with a set of relay contacts,
   means for producing an electrical signal having a value in accordance with the speed of said motor, and
   means connected to the operating means and responsive solely to said electrical signal for automatically changing the rate of intermittent operation of said motor when it undergoes a change in speed and including a relay for operating said relay contacts in said bypass or shunt.

5. Apparatus as defined in claim 4 wherein said relay includes contacts which are normally open and are closed upon the detection of a change in speed.

6. Apparatus for controlling the speed of a windshield wiper, which comprises
   a motor for operating the wiper,
   means for operating said motor intermittently,
   means for producing an electrical signal having a value in accordance with the speed of said motor,
   means connected to the operating means and including a comparator responsive solely to said electrical signal for automatically changing the rate of intermittent operation of said motor when it undergoes a change in speed.

7. Apparatus as defined in claim 6 wherein said comparator has one input terminal connected to a resistance capacitance discharge circuit.

8. Apparatus as defined in claim 6 wherein wherein said resistance capacitance dischange circuit is energized by an amplifier.

9. Apparatus for controlling the speed of a windshield wiper, which comprises
   a motor for operating the wiper,
   means for operating said motor intermittently,
   means for producing an electrical signal having a value in accordance with the speed of said motor, and
   means connected to the operating means and responsive solely to said electrical signal for automatically changing the rate of intermittent operation of said motor when it undergoes a change in speed and comprising relay-controlled means having a changeable time constant.

10. Apparatus as defined in claim 9 wherein a change in speed signal is developed across a motor resistor and said signal controls the operating means in shunt.

11. Apparatus as defined in claim 9 wherein said operating means comprises a capacitor directly connected to said motor, a pair of relay contacts connected to said capacitor, a switch for intermittent operation connected to said contacts, and a battery interconnecting said switch and the operating means; and wherein the changing means comprises an amplifier connected to said operating means, and a relay for operating said contacts connected to said amplifier.

12. Apparatus as defined in claim 9 wherein said operating means comprises a set of normally closed contacts directly connected to said motor, a switch for intermittent operation connected to said contacts, and a battery interconnecting said switch and the operating means; and wherein the changing means comprises an amplifier connected to said operating means, a time-constant circuit in shunt with the output of said amplifier, a comparator having a negative input terminal connected to said time-constant circuit and a positive input terminal connected to ground, and a relay connected to the output of said comparator for opening said normally closed contacts.

* * * * *